(12) United States Patent
Silkey et al.

(10) Patent No.: US 8,727,286 B2
(45) Date of Patent: May 20, 2014

(54) SYSTEMS AND METHODS FOR CONTROLLING FLOWS WITH PULSED DISCHARGES

(75) Inventors: Joseph S. Silkey, Florissant, MO (US); Philip Smereczniak, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/523,761

(22) Filed: Jun. 14, 2012

(65) Prior Publication Data

US 2013/0001368 A1   Jan. 3, 2013

Related U.S. Application Data

(62) Division of application No. 12/339,674, filed on Dec. 19, 2008, now Pat. No. 8,220,753.

(60) Provisional application No. 61/019,202, filed on Jan. 4, 2008.

(51) Int. Cl.
*B64C 23/04* (2006.01)

(52) U.S. Cl.
USPC ........................................ 244/205; 244/204.1

(58) Field of Classification Search
USPC ........................................ 244/204, 204.1, 205
See application file for complete search history.

(56) References Cited

U.S. PATENT DOCUMENTS

| | | | | |
|---|---|---|---|---|
| 2,761,283 A | * | 9/1956 | Houle | 60/39.27 |
| 3,095,163 A | * | 6/1963 | Hill | 244/12.1 |
| 3,508,029 A | * | 4/1970 | Inoue | 219/149 |
| 3,620,484 A | * | 11/1971 | Schoppe et al. | 244/130 |
| 3,662,214 A | * | 5/1972 | Lustig | 315/167 |
| 3,709,446 A | * | 1/1973 | Espy | 244/1 N |
| 3,831,052 A | * | 8/1974 | Knechtli | 313/595 |
| 3,875,629 A | * | 4/1975 | Kerstetter | 445/36 |
| 4,008,866 A | * | 2/1977 | Rethorst | 244/1 N |
| 4,109,218 A | * | 8/1978 | Schneider et al. | 359/342 |
| 4,363,991 A | * | 12/1982 | Edelman | 310/316.01 |

(Continued)

FOREIGN PATENT DOCUMENTS

| | | |
|---|---|---|
| DE | 102006008864 A1 | 9/2007 |
| EP | 1926353 A1 | 5/2008 |

(Continued)

OTHER PUBLICATIONS

"Atmospheric Absorption in UV Band," http://www.globalwarmingart.com/wiki/Image:Atmospheric_Transmission_png, Jun. 2007, 4 pages.

(Continued)

*Primary Examiner* — Tien Dinh
*Assistant Examiner* — Michael Kreiner
(74) *Attorney, Agent, or Firm* — Perkins Coie LLP

(57) ABSTRACT

Systems and methods for controlling air vehicle boundary layer airflow are disclosed. Representative methods can include applying electrical energy bursts and/or other energy bursts in nanosecond pulses in the boundary layer along a surface of an air vehicle. In a particular embodiment, electrical energy is discharged into the boundary layer to reduce the tendency for the boundary layer to separate and/or to reduce the tendency for the boundary layer to transition from laminar flow to turbulent flow. Representative actuators discharging the energy can be arranged in a two-dimensional array of individually addressable actuators.

13 Claims, 11 Drawing Sheets

(56) References Cited

U.S. PATENT DOCUMENTS

| | | | |
|---|---|---|---|
| 4,395,770 A * | 7/1983 | Silfvast et al. | 372/62 |
| 4,453,196 A * | 6/1984 | Herr | 361/232 |
| 4,749,151 A | 6/1988 | Ball et al. | |
| 4,802,642 A * | 2/1989 | Mangiarotty | 244/200 |
| 4,825,446 A * | 4/1989 | Maitland et al. | 372/87 |
| 4,932,610 A * | 6/1990 | Maestrello | 244/203 |
| 5,050,805 A * | 9/1991 | Lloyd et al. | 239/424 |
| 5,320,309 A * | 6/1994 | Nosenchuck et al. | 244/205 |
| 5,359,257 A * | 10/1994 | Bunch et al. | 313/310 |
| 5,437,421 A * | 8/1995 | Nosenchuck et al. | 244/205 |
| 5,669,583 A * | 9/1997 | Roth | 244/130 |
| 5,686,789 A * | 11/1997 | Schoenbach et al. | 313/491 |
| 5,797,563 A * | 8/1998 | Blackburn et al. | 244/130 |
| 5,803,409 A * | 9/1998 | Keefe | 244/206 |
| 5,828,684 A | 10/1998 | Van de Walle | |
| 5,901,928 A * | 5/1999 | Raskob, Jr. | 244/204 |
| 5,917,286 A * | 6/1999 | Scholl et al. | 315/111.21 |
| 5,920,923 A | 7/1999 | Jillette | |
| 5,934,622 A * | 8/1999 | Meng | 244/205 |
| 5,938,404 A * | 8/1999 | Domzalski et al. | 416/91 |
| 5,938,854 A * | 8/1999 | Roth | 134/1 |
| 5,964,433 A * | 10/1999 | Nosenchuck | 244/205 |
| 6,079,345 A * | 6/2000 | Tsunoda | 114/67 R |
| 6,200,539 B1 * | 3/2001 | Sherman et al. | 216/67 |
| 6,220,549 B1 * | 4/2001 | Tsunoda et al. | 244/205 |
| 6,247,671 B1 * | 6/2001 | Saeks et al. | 244/205 |
| 6,276,636 B1 | 8/2001 | Krastel | |
| 6,518,692 B2 * | 2/2003 | Schoenbach et al. | 313/356 |
| 6,527,221 B1 * | 3/2003 | Kremeyer | 244/1 N |
| 6,528,947 B1 * | 3/2003 | Chen et al. | 315/111.21 |
| 6,570,333 B1 * | 5/2003 | Miller et al. | 315/111.21 |
| 6,805,325 B1 * | 10/2004 | Malmuth et al. | 244/205 |
| 6,978,767 B2 * | 12/2005 | Bonutti | 123/478 |
| 7,017,594 B2 * | 3/2006 | Kurunczi | 134/22.18 |
| 7,017,863 B2 * | 3/2006 | Scott et al. | 244/205 |
| 7,066,431 B2 * | 6/2006 | Scott et al. | 244/134 D |
| 7,094,314 B2 * | 8/2006 | Kurunczi | 156/345.44 |
| 7,380,756 B1 * | 6/2008 | Enloe et al. | 244/175 |
| 7,624,941 B1 * | 12/2009 | Patel et al. | 244/3.22 |
| 7,641,153 B2 * | 1/2010 | Smereczniak | 244/205 |
| 7,703,479 B2 * | 4/2010 | Jacob | 137/828 |
| 7,744,039 B2 * | 6/2010 | Miles et al. | 244/205 |
| 7,870,720 B2 * | 1/2011 | Hagseth et al. | 60/204 |
| 7,988,101 B2 | 8/2011 | Osborne et al. | |
| 8,006,939 B2 | 8/2011 | McClure et al. | |
| 8,016,246 B2 * | 9/2011 | Schwimley et al. | 244/205 |
| 8,091,836 B2 * | 1/2012 | Minick | 244/205 |
| 8,091,950 B2 * | 1/2012 | Corke et al. | 296/180.1 |
| 8,251,312 B1 * | 8/2012 | Daso et al. | 244/130 |
| 8,308,112 B2 * | 11/2012 | Wood et al. | 244/205 |
| 2004/0118973 A1 | 6/2004 | Malmuth et al. | |
| 2004/0144733 A1 * | 7/2004 | Cooper et al. | 210/748 |
| 2006/0022606 A1 * | 2/2006 | DeVries et al. | 315/169.4 |
| 2006/0038087 A1 * | 2/2006 | Minick et al. | 244/205 |
| 2006/0131282 A1 * | 6/2006 | Miller et al. | 219/121.5 |
| 2007/0145192 A1 * | 6/2007 | Henne et al. | 244/139 |
| 2007/0176046 A1 * | 8/2007 | Kremeyer | 244/1 N |
| 2007/0241229 A1 * | 10/2007 | Silkey et al. | 244/53 A |
| 2008/0023589 A1 | 1/2008 | Miles et al. | |
| 2008/0067283 A1 * | 3/2008 | Thomas | 244/1 N |
| 2008/0116808 A1 * | 5/2008 | McClure et al. | 315/111.61 |
| 2008/0122252 A1 | 5/2008 | Corke et al. | |
| 2008/0290218 A1 | 11/2008 | Schwimley et al. | |
| 2009/0018703 A1 | 1/2009 | Mangalam et al. | |
| 2009/0173836 A1 * | 7/2009 | Kremeyer | 244/204 |
| 2009/0173837 A1 * | 7/2009 | Silkey et al. | 244/205 |
| 2010/0004799 A1 * | 1/2010 | Drouin et al. | 701/3 |
| 2010/0127624 A1 * | 5/2010 | Roy | 315/111.21 |
| 2010/0133386 A1 * | 6/2010 | Schwimley et al. | 244/205 |
| 2010/0284825 A1 * | 11/2010 | Land et al. | 417/48 |
| 2012/0074263 A1 * | 3/2012 | Hansen et al. | 244/205 |
| 2012/0193483 A1 * | 8/2012 | Essenhigh et al. | 244/205 |
| 2012/0256056 A1 * | 10/2012 | Seifert et al. | 244/204.1 |

FOREIGN PATENT DOCUMENTS

| | | |
|---|---|---|
| EP | 1953382 | 6/2008 |
| GB | 2244252 A | 11/1991 |
| RU | 2005133953 | 3/2005 |
| WO | WO-9410032 A1 | 5/1994 |
| WO | WO-2007054774 | 5/2007 |

OTHER PUBLICATIONS

"Deep UV Lasers 224 and 248 nm," http://www.photonsystems.com/pdfs/duv-lasersource-rev2.pdf, 2 pages.

"FQCW 266 Diode Pumped Continuous Wave Solid State Laser," www.crylas.de, 2008, 2 pages.

"IV.30—Drift Step Recovery Diodes?" http://www.avtechpulse.com/faq/html/IV.30/ accessed Mar. 5, 2009, 1 page.

"MHE—Pulse Systems Group," http://www.moose-hill.com/pulse.htm, accessed Mar. 5, 2009, 4 pages.

A. A. Maslov, B. Yu. Zanin, A. A. Sideorenko, B.V Postnikov, V. P. Fomichev, A.D. Budovsky and N. Malmuth, "Two-Channel Spark Discharge for Flow Control on a Body of Revolution," AIAA Paper No. 2005-040, Reno NV, Jan. 10-13, 2005.

Anderson, R., Roy S., "Preliminary Experiments of Barrier Discharge Plasma Actuators using Dry and Humid Air," Paper AIAA2006-0369, 44th AIAA Aerospace Sciences Meeting and Exhibit, Reno, NV, Jan. 9-12, 2006.

Boeuf, J. P., Pitchford, L.C., "Electrohydrodynamic force and aerodynamic flow acceleration in surface dielectric barrier discharge," Journal of Applied Physics 97, 103307, 2005, 10 pages.

Chen J., Park, S., Fan, Z., Eden, J. G., Liu, C., "Development and Characterization of Micromachined Hollow Cathode Plasma Display Devices," Journal of Microelectromechanical Systems, vol. 11, No. 5, Oct. 2002, pp. 536-543.

Corke et al., "Order of Magnitude Improvement of SDBD Acuator Effect," AF Academy Workshop on Plasma Actuators, Nov. 8, 2006, 23 pages.

Corke, T., "Plasma Flow Control Optimized Airfoil," Paper AIAA-2006-1208, 44th AIAA Aerospace Sciences Meeting and Exhibit, Reno, NV, Jan. 9-12, 2006.

Corke, T.C., and Post, M.L., "Overview of Plasma Flow Control: Concepts, Optimization, and Applications," AIAA Paper No. 2005-563, Reno NV, Jan. 10-13, 2005.

Corke, T.C., Jumper E.J., Post, L.L., Orlov, D. and McLaughlin, T.E., "Application of Weakly-Ionized Plasma as Wing Flow-Control Device," Paper AIAA 2002-350, 40th AIAA Aerospace Sciences Meeting & Exhibit, Reno, NV Jan. 14-17, 2002.

D.V. Roupassov, I.N. Zavyalov, A.Yu. Starikov, "Boundary Layer Separation Plasma Control Using Low-Temperature Non-Equilibrium Plasma of Gas Discharge," 44-rd AIAA Aerospace Sciences Meeting and Exhibit, Reno, Nevada, USA, paper AIAA-2006-373, 2006.

Enloe, C.L., McLaughlin, T.E., VanDyken, R.D., Kachner, K.D., Jumper E.J., Corke, T.C., Post, M. and Hadded, O., "Mechanisms and Responses of a Single Dielectric Barrier Plasma Actuator: Plasma Morphology," AIAA Journal, vol. 42, No. 3, 2004, pp. 589-594. (EnloeMechanisms).

Enloe, C.L., T.E., Van Dyken, R.D., Kachner, K.D., Jumper, E.J. Corke, T.C., Post, M., and Hadded, O., "Mechanisms and Responses of a Single Dielectric Barrier Plasma Actuator: Geometric Effect," AIAA Journal, vol. 42, No. 3, 2004, pp. 595-604. (EnloeGeometricEffects).

Gaitonde, D., "A Coupled Approach for 3-D RF-Based Flow Control Stimulations," Paper AIAA-2006-1205, 44th AIAA Aerospace Sciences Meeting and Exhibit, Reno, NV, Jan. 9-12, 2006.

Hall, Kortny, "Potential Flow Model for Plasma Actuation as Lift Enhancement Device—A Thesis," Graduate Program in Aerospace and Mechanical Engineering, Notre Dame, Indiana, Jul. 2004, 119 pages.

Huang, Junhui, "Separation Control Over Low Pressure Turbine Blades Using Plasma Actuators—A Dissertation," Graduate Program in Aerospace & Mechanical Engineering, Notre Dame, Indiana, Jul. 2005, 194 pages.

(56) References Cited

OTHER PUBLICATIONS

International Search Report and Written Opinion, International Application No. PCT/US08/88198, Applicant:The Boeing Company, mailed on Nov. 18, 2009, 2 pages.
International Search Report, International Application No. PCT/US08/88198, Applicant: The Boeing Company, 2 pages (Partial ISR).
J. Reece Roth and Xin Dai, "Optimization of the Aerodynamic Plasma Actuator as an Electrohydrodynamic (EHD) Electrical Device," AIAA Paper No. 2006-1203, Reno NV, Jan. 9-12, 2006.
Likhanskii, A., Shneider, M., Macheret, S., and Miles, R., "Modeling of Interaction Between Weakly Ionized Near-Surface Plasmas and Gas Flow," Paper AIAA-2006-1204, 44th AIAA Aerospace Sciences Meeting and Exhibit, Reno, nevado, Jan. 9-12, 2006.
Likhanskii, A.V., Shneider, M.N, Shneider, Miles, R.B., "Optimization of Dielectric Barrier Discharge Plasma Actuators Driven by Repetitive Nanosecond Pulses," Paper AIAA-2007-633, 45th AIAA Aerospace Science Meeting and Exhibit, Reno NV, Jan. 8-11, 2007.
Loeb, L.B., "Ionizing Waves of Potential Gradients," Science 148, p. 1417, 1965.
Oh, Hye-Keun, "Process Study of a 200 nm Laser Pattern Generator," Journal of the Korean Physical Society, vol. 41, No. 6, Dec. 2002, pp. 839-842.
Opaits, D.F., Roupassov, D.V., Starikovskaia, S.M., Starikovskii, A.Yu., Zavialov, I.N., and Saddoughi, S.G., "Plasma Control of Boundary Layer Using Low-Temperature Non-Equilibrium Plasma of Gas Discharge," Paper AIAA 2005-1180, 43rd AIAA Aerospace Sciences Meeting and Exhibit, Reno, NV, Jan. 10-13, 2005.
Orlov, D.M., and Corke, T.C., "Numerical Simulation of Aerodynamic Plasma Actuator Effects," Paper AIAA 2005-1083, 43rd AIAA Aerospace Sciences and Meeting and Exhibit, Reno, NV, Jan. 10-13, 2005.
Patel et al., "Plasma Actuators for Hingeless Aerodynamic Control of an Unmanned Air Vehicle," Journal of Aircraft, vol. 44, No. 4, Jul.-Aug. 2007, 11 pages. (8256 ISR).
Post, M., and Corke, T.C., "Flow Control with Single Dielectric Barrier Plasma Actuator" Paper AIAA 2005-4630, 35th AIAA Fluid Dynamics Conference and Exhibit, Toronto, Ontario, Jun. 6-9, 2005.
Post, M.L., and Corke T.C., "Separation Control on High Angle of Attack Airfoil Using Plasma Actuators," AIAA Journal, vol. 42, No. 11, 2004, pp. 2177-2184.
Post, Martiqua L., "Plasma Actuators for Separation Control on Stationary and Oscillating Airfoils," Department of Aerospace and Mechanical Engineering, Notre Dame, Indiana, May 2004, 113 pages.
Roth, J.R., "Optimization of the Aerodynamic Plasma Actuator as an Electrohydrodynamic (EHD) Electrical Device," Paper AIAA-2006-1203, 44th AIAA Aerospace Sciences Meeting and Exhibit, Reno, NV, Jan. 9-12, 2006.
Roth, J.R., Sherman D. M. and Wilkinson S. P.: "Boundary Layer Flow Control with a One Atmosphere Uniform Flow Discharge Surface Plasma". AIAA Paper 98-0328, Proc of the 36th AIAA Aerospace Sciences Meeting & Exhibit Reno, NV, Jan. 12-15, 1998.
Roy et al., "Ionized Collisional Flow Model for Atmospheric RF Application," AIAA-2004-2354 AIAA Plasmadynamics and Laser Conference, Portland, Oregon, Jun. 28-Jul. 1, 2004, 9 pages.
Roy et al., "Multidimensional Collisional Dielectric Barrier Discharge for Flow Separation Control at Atmospheric Pressures," AIAA-2005-4631, 35th AIAA Fluid Dynamics Conference and 36th AIAA Plasma Dynamics and Laser Conference, Toronto, Canada, Jun. 2005, 10 pages.
Roy, S., "Flow Actuation Using Radio Frequency in Partially Ionized Collisional Plasmas," Applied Physics Letters, vol. 86, 2005, pp. 1001502-1-101502-3.
Roy, S., and Gaitonde, D.V., "Modeling Surface Discharge Effects of Atmosphere RF on Gas Flow Control," Paper AIAA 2005-160, 43rd AIAA Aerospace Sciences Meeting and Exhibit, Reno, NV, Jan. 10-13, 2005.
Shang et al., "Mechanisms of Plasma Actuators for Hypersonic Flow Control," Progress in Aerospace Sciences, http://www.sciencedirect.com/science/article/pii/S0376042105001235, vol. 41, Issue 8, Nov. 2005, pp. 642-668.
Sidorenko, A.A., Boris, Y.Z., Boris, V.P., Budovsky, A.D., "Pulsed Discharge Actuators for Rectangular Wing Separation Control," American Institute of Aeronautics and Astronautics, 2007, pp. 1-11.
Singh, K.P. and Roy, S., "Phase Effect on Flow Control for Dielectric Barrier Plasma Actuators," Applied Physics Letters, vol. 89, No. 1., Jul. 2006, 3 pages.
Singh, K.P. And Roy, S., "Simulation of an Asymmetric Single Dielectric Barrier Plasma Actuator," Journal of Applied Physics, vol. 98, 2005, 083303-1-083303-7.
Wu, J.-Z., Lu, X.-Y., Denny, A.G., Fan, M., and Wu, J.-M, "Post Stall Flow Control on an Airfoil by Local Unsteady Forcing," J. Fluid Mech., 371, 21-58, 1998.
Zavyalov I.N., Roupassov D.V., Starikovsii A. Yu., Saddoughi S.G., "Boundary Layer Control" by Gas Discharge Plasma. EUCASS, Moscow, 2005.

\* cited by examiner

| Application | Rotorcraft | Transport/ Tankers | Military Fixed Wing | Missiles/ Munitions |
|---|---|---|---|---|
| High Lift Flow Separation Control | X | X | X | |
| Leading Edge Stall | | X | X | |
| Trailing Edge Flap | | X | X | X |
| Wing Camber/Twist Control | X | X | X | |
| Wing Tip Stall Control | X | X | X | |
| Hinge-Less Flight Controls | | | X | X |
| Forebody Vortex Control | | | X | X |
| Rotor Downwash Alleviation | X | | | |
| Aft Body/Boattail Drag | X | X | X | X |
| Inlet Flow Control | | X | X | X |

*Fig. 3*

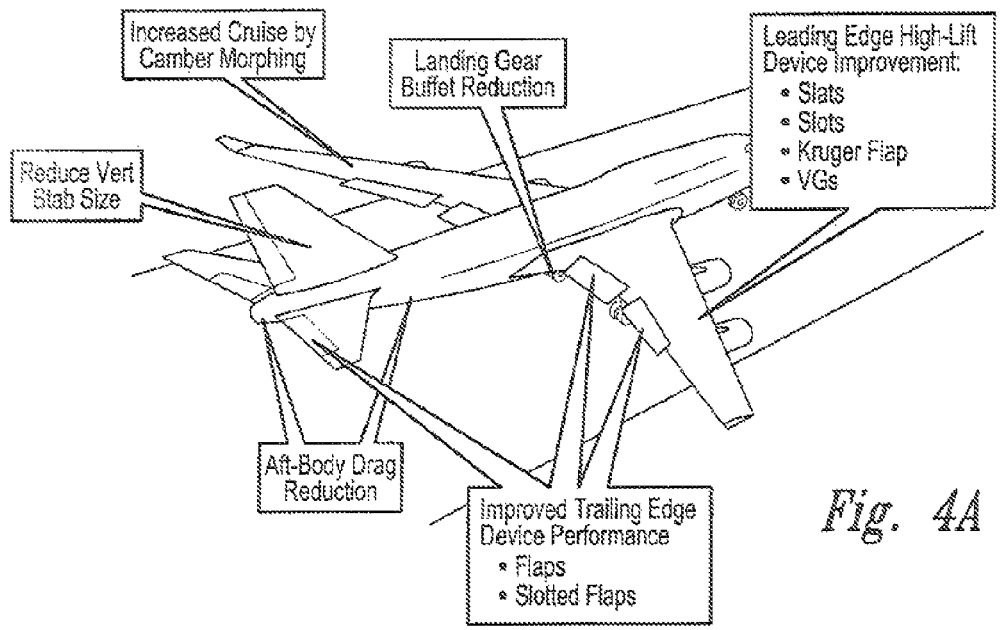

*Fig. 4A*

| Application | Improvement Area | Installation Location and Expected Result |
|---|---|---|
| High Lift System Leading Edge | Leading Edge Slat, Krueger Flap. | Apply Actuators to Leading Edge Contour to Control Separation. |
| High Lift System Trailing Edge Flap | Augment Trailing Edge Flap Performance | Apply Selected Actuators to Airfoil (Trailing Edge) or Flap to Energize Flow Over Flap |
| Morphing Wing | Wing Camber. Optimize Aerodynamics Throughout the Flight Envelope | Actuators Distributed Over Wing Surface to Provide "Virtual" Camber That Can Be Tailored To A Specific Flight Condition |
| Blended Wing Body | Delay Onset of Stall and Increase Angle-of-Attack | Distributed Actuators on Wing to Maintain Attached Flow |
| Vertical Stabilizer | Increase Effectiveness of TE Control Surface | Apply Actuators Around Hinge Point of the Stabilizer |
| Bluff Body Drag | Landing Gear Noise and Drag | Actuators Applied to Surfaces to Control Separation and Vortex Shedding |

*Fig. 5A*

| Application | Improvement Area | Installation Location and Expected Result |
|---|---|---|
| High Lift | Lift Improvement For Takeoff and Landing | Actuators Applied to Leading and Trailing Edge of Wing Control Surface to Provide Enhanced Lift |
| Directional Control | Aerodynamic Directional Control on Tailless Air Vehicles | Use Actuator to Separate Flow At Wing Tips. The Drag Force When Coupled With Wing Semi-Span Moment Arm Generates Directional Control. |
| Lateral Control | Aerodynamic Lateral Control on Tailless Air Vehicle | Modulation of Section CL on Outer Wing Panel to Produce Rolling Moment |
| Morphing Wing | Wing Camber. Optimize Aerodynamics Throughout the Flight Envelope. | Actuators Distributed Over Wing Surface to Provide "Virtual" Camber That Can Be Tailored to a Specific Flight Condition |
| Pitch-Up | Fuselage and Wing Root | Stabilize Body/Wing Root Shocks |

*Fig. 5B*

| Application | Improvement Area | Installation Location and Expected Result |
|---|---|---|
| Rotor Blade Performance Improvements | Increase Blade Airfoil L/D and Climax in Retreating Blade Sector | Apply Actuators to Outboard Airfoils to Delay Stall, Reduce Pitching Moments, and Reduce Drag |
| Canard Rotor Wing (CRW) Trailing Edge Elliptical Airfoil Cross-section | Reduced Drag Associated With Elliptical Cross-Section Shape Airfoil Found on CRW Air Vehicle | Apply Actuators at Trailing Edge of Elliptical Cross-Section Rotorwing to Reduce or Eliminate Significant Flow Separation on Trailing Edge |
| CRW Hub Fairing | Reduce Drag Associated With CRW Hub Fairing | Apply Actuators to the Hub Fairing to Reduce or Eliminate Significant Flow Separation |
| Aft Fuselage Closure | Reduce Afterbody Drag | Apply Actuators to Reduce Boattail Drag on Configurations That Have Rapid Cross-Sectional Area Closure for a Fixed Vehicle Length |
| Helicopter Pylon Drag Reduction | Large Transport Helicopters (CH-46, CH-47, Ch-53) Have Pylons Covering the Shaft and Transmissions | Apply Actuators to the Usually Blunt Base Fore and Aft Pylons |

*Fig. 5C*

| Application | Installation Location and Expected Result |
|---|---|
| Inlet Ducts and Nacelles | Apply Actuators to Reduce Flow Separation |
| Forebody Boundary Layer Mangement | Place Actuators on Forebody to Modify the Boundary Layer Thickness and Shape Prior to Inlet Ingestion |
| Supersonic Inlet Boundary Layer Turning | Place Actuators on the Forebody Ramps to Maintain Flow Attachment During Compression |

*Fig. 5D*

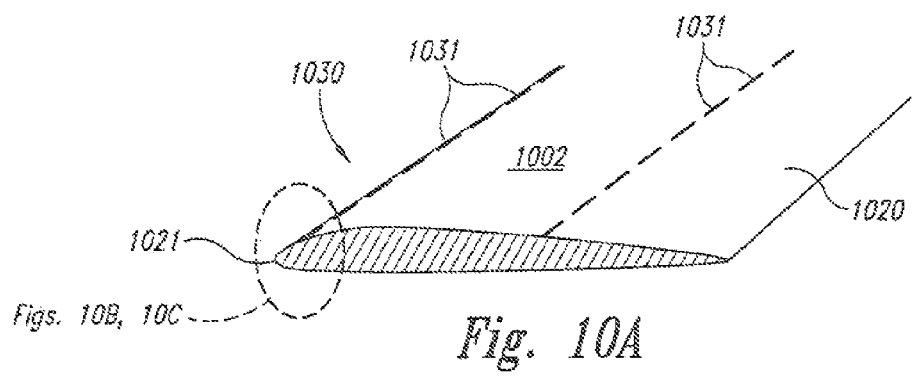
Fig. 10A
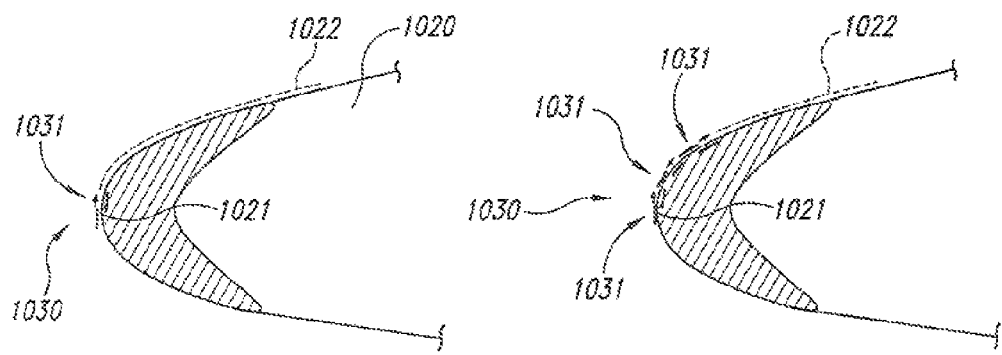
Fig. 10B
Fig. 10C

SYSTEMS AND METHODS FOR CONTROLLING FLOWS WITH PULSED DISCHARGES

CROSS-REFERENCE TO RELATED APPLICATION

The present application is a divisional application of U.S. patent application Ser. No. 12/339,674, filed Dec. 19, 2008, which claims priority to U.S. Provisional Application No. 61/019,202, filed Jan. 4, 2008, each of which is incorporated herein by reference in its entirety.

TECHNICAL FIELD

The present disclosure is directed generally to systems and methods for controlling flows with pulsed discharges, including via dielectric barrier discharge generators, plasma actuators, hollow cathode arrays, particle accelerators, UV light, laser emitters, and/or other devices.

BACKGROUND

During flight, a boundary layer of air builds up on the exposed surfaces of an aircraft. The boundary layer is a thin film of low velocity, low dynamic pressure air located near a solid boundary and resulting from the air being at rest along the solid boundary. The boundary layer which forms on surfaces located upstream of an aircraft engine can become ingested by the engine and decrease the recovery of total pressure and corresponding thrust performance. Further, the ingested boundary layer increases the flow distortion (a measurement of the quality or uniformity of flow characteristics) at the engine and thereby decreases the stability of engine operation. On the aircraft wing and/or other external surfaces of the aircraft, the boundary layer can increase skin friction and therefore drag. In some instances, the boundary layer can cause premature separation of the flow from the external surface, further increasing drag and/or reducing lift.

As a result of the foregoing drawbacks associated with boundary layers, many aircraft have employed some type of boundary layer removal, reduction, and/or control system to provide for stable engine operation and increased aerodynamic performance. Representative systems include boundary layer diverters, "bump" boundary layer deflectors, boundary layer bypass ducts, vortex generators, and porous surfaces or slots that either bleed boundary layer flow from the surface, or energize the flow by air injection. Unfortunately, these systems are often complex and can entail a substantial increase in aircraft weight and/or volume.

One recent technique for addressing boundary layer flow is to use a dielectric barrier discharge device to energize and/or redirect the boundary layer flow. These devices operate by ionizing air adjacent to the flow surface in such a way as to generate or direct flow adjacent to the surface. Accordingly, dielectric barrier discharge devices typically include a pair of electrodes separated by a dielectric material. The voltage applied to at least one of the electrodes is typically cycled in a sinusoidal fashion to ionize the adjacent air. While the foregoing approach has been shown to create the desired effect on the boundary layer at relatively low speeds for realistic air vehicle applications, there remains a need for devices that better control boundary layer flow and do so in a manner that is more efficient and effective than techniques associated with existing devices, and that can operate at higher flow speeds associated with realistic aircraft operations.

SUMMARY

The following summary is provided for the benefit of the reader only and is not intended to limit the disclosure in any way. The present disclosure is directed generally to systems and methods for controlling flows with pulsed discharges. A method for controlling air vehicle airflow in accordance with a particular embodiment includes forming a boundary layer on a surface of an air vehicle. The method further includes reducing a tendency for the boundary layer to separate, and/or reducing a tendency for the boundary layer to transition from laminar flow to turbulent flow, by activating different individually addressable actuators in different manners. The individually addressable actuators can be arranged in a two-dimensional array at the surface. In further particular embodiments, activating different individually addressable actuators includes activating different plasma actuators, or different hollow cathode actuators.

An apparatus for controlling air vehicle airflow in accordance with another embodiment includes an airflow surface and an array of individually addressable actuators positioned at the airflow surface, within individual actuators coupled to a power source to deliver energy into boundary layer flow adjacent to the airflow surface. The apparatus can further include a controller that is operably coupled to the individual actuators and is programmed with instructions for activating different individually addressable actuators in different manners. For example, individual actuators can be activated at different times and in a particular embodiment, the controller can be programmed with instructions to sequentially activate the actuators in a generally streamwise direction.

Still another embodiment of the disclosure is directed to an apparatus for controlling air vehicle airflow, and includes an airflow surface and a radiation emitter positioned to direct radiation generally parallel to the airflow surface. The apparatus can further include a receiver spaced apart from the emitter to receive radiation after the radiation has transited over at least a portion of the airflow surface. For example, the radiation emitter can include a laser emitter and, in a further particular embodiment, can emit radiation at wavelengths of greater than about 200 nanometers.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

FIG. 3 is a table identifying representative aircraft and corresponding locations at which actuators may be used to control flow in accordance with particular embodiments of the disclosure.

FIG. 4A illustrates a fixed-wing aircraft identifying locations at which actuators may be positioned in particular embodiments.

FIGS. 5A-5D are tables illustrating actuator locations for air vehicles in accordance with further particular embodiments.

FIGS. 10A-10C are partially schematic illustrations of airfoils having flow control systems configured in accordance with further embodiments of the disclosure.

DETAILED DESCRIPTION

The following description is directed generally toward systems and methods for controlling flows with pulsed discharges, for example, via plasmas generated by dielectric barrier discharge devices, other plasma actuators, and/or other devices including laser emitters, hollow cathode arrays, and particle accelerators. Several details describing structures or processes that are well-known and often associated with aspects of these systems and methods are not set forth in the following description for purposes of brevity. Moreover, although the following description sets forth several representative embodiments, several other embodiments can have different configurations or different components than those described in this section. As such, other embodiments of the disclosure may have additional elements or may eliminate several of the elements described below with reference to FIGS. 1-12.

Several embodiments of the disclosure described below may take the form of computer-executable instructions, including routines executed by a programmable computer (e.g., a controller). Those skilled in the relevant art will appreciate that one or more embodiments can be practiced on computer systems other than those shown and described below. Instructions can be embodied in a special-purpose computer or data processor that is specifically programmed, configured or constructed to perform one or more of the computer-executable instructions described below. Accordingly, the term "computer" as generally used herein, refers to any data processor, and can include controllers, multi-processor systems, processor-based or programmable consumer electronics, network computers, mini-computers and the like.

Figure 1:
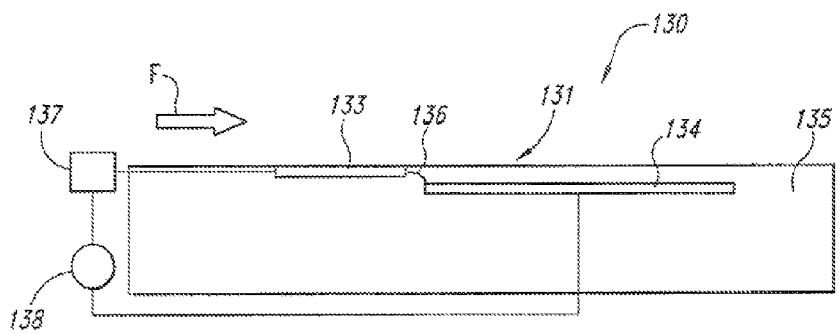
FIG. 1 is a schematic illustration of a flow control system, including components of an actuator, configured in accordance with an embodiment of the disclosure.

FIG. 1 is a partially schematic, cross-sectional illustration of a flow control assembly 130 that includes a representative actuator 131 configured in accordance with an embodiment of the disclosure. The flow control assembly 130 can include more than one actuator 131, but a single actuator 131 is shown in FIG. 1 for purposes of illustration. The actuator 131 can include a first electrode 133, a second electrode 134, and a dielectric material 135 positioned between the first and second electrodes 133, 134. Accordingly, the first and second electrodes 133, 134 are separated by a gap 136.

In a particular embodiment, the first electrode 133 is located upstream (with reference to a local air flow direction F) from the second electrode 134, and the upper surface of the first electrode 133 is typically flush with the surrounding flow surfaces. The first electrode 133 is also typically "exposed" to the flow. As used in this context, "exposed" means that the first electrode 133 is in direct electrical contact with the flow, or at least more direct electrical communication with the flow than is the second electrode 134. The exposed first electrode 133 can accordingly include a protective coating or other material that restricts or prevents erosion due to environmental conditions, without unduly impacting the electrical communication between the first electrode 133 and the adjacent flow, e.g., without unduly impacting the ability to provide direct current coupling between the first electrode 133 and the adjacent flow. In other embodiments, the material forming the first electrode 133 can be selected to have both suitable electrical conductivity and suitable resistance to environmental factors. A representative material includes stainless steel.

In particular embodiments, the first electrode 133 can include a conductive environmental coating. For example, the first electrode 133 can include a coating formed from a thin layer of tungsten, tungsten carbide (or another tungsten alloy), nichrome or stainless steel. In other embodiments, the coating can include a semiconductive material that becomes conductive as the high voltages described above are applied to the first electrode 133. For example, the first electrode 133 can include a silicon or gallium arsenide bulk material treated with a suitable dopant (e.g., boron or phosphorus, in the case of silicon). In other embodiments, other suitable conductive and/or semiconductive materials can be applied to the first electrode. In any of these embodiments, the material can be selected to provide the necessary level of conductivity and the necessary resistance to environmental conditions, including resistance to rain erosion, oxidation and exposure to fuel and/or ice protection chemicals.

It is expected that the majority of the electric field lines emanating from the first electrode 133 will emanate from the trailing edge of the electrode. Accordingly, in at least some cases, the environmental coating can be applied to the majority of the exposed surface of the first electrode 133, leaving only a small, aft portion of the first electrode 133 uncoated. In such cases, the coating may be selected to be entirely nonconductive (e.g., a dielectric coating) without causing undue interference with the ionizing electrical field emanating from the first electrode 133.

The second electrode 134 can be covered or at least partially covered with the dielectric material 135, for example, to prevent direct arcing between the two electrodes. The first electrode 133 or the second electrode 134 is coupled to a controller 137, which is in turn coupled to a power supply 138 to control the power delivered to the first electrode 133 or the second electrode 134. The other electrode 133 or 134 may also be coupled to the power supply 138 and/or the controller 137, or may simply be grounded. The controller 137 can include a computer having a computer-readable medium programmed with instructions to direct a signal waveform to the first electrode 133, in a manner that is expected to enhance the efficiency and/or the effectiveness of the actuator 131.

In many instances, it is expected that relatively high voltage, narrow-width pulses can have a beneficial effect on boundary layers by delaying the transition from laminar to turbulent flow in the boundary layer, and/or by delaying the point at which the boundary layer separates from the surface adjacent to which it flows. Further details of representative pulsed discharge actuators are included in AIAA paper 2007-941, titled "Pulsed Discharge Actuators for Rectangular Wing Separation Control" (Sidorenko et al.) presented at the 45th AIAA Aerospace Sciences Meeting and Exhibit, Reno, Nev., Jan. 8-11, 2007, and incorporated herein by reference. Suitable pulse generators are available from Moose Hill Enterprises, Inc. of 54 Jennie Dade Lane, Sperryville, Va. 22740.

Figure 2A:
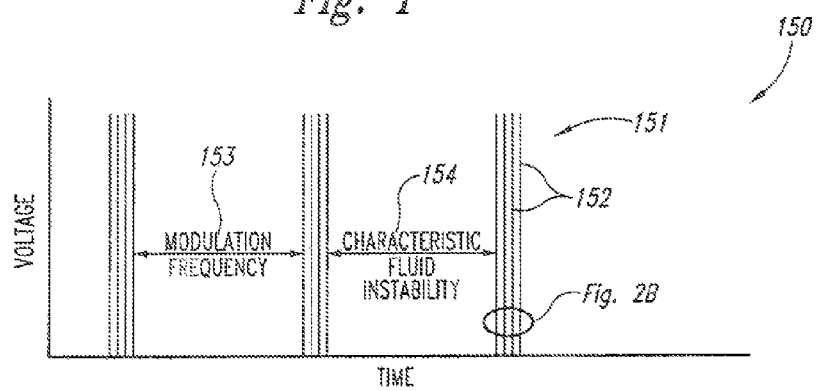
FIGS. 2A and 2B illustrate representative wave forms of electrical signals applied to an actuator in accordance with an embodiment of the disclosure.

FIG. 2A illustrates a representative wave form 150 that can be applied by the controller 137 (FIG. 1) to the actuator 131 (FIG. 1). The wave form 150 includes a series of pulse bursts 151, each of which includes one or more pulses 152. The pulse bursts 151 are spaced apart in accordance with a modulation frequency 153. In a particular embodiment, the modulation frequency 153 is selected to match or in another manner correspond with a characteristic fluid instability frequency 154 present in the flow adjacent to the actuator from which the signals emanate. For purposes of illustration. reference numerals 153 and 154 point to periods in FIG. 2A, but are discussed herein in the context of frequencies. The fluid instability to which the frequencies 153, 154 correspond can include Tollmein-Schlichting instabilities, eddy instabilities, sheer layer instabilities, and/or other fluid instabilitie. In general, the modulation frequency 153 can be selected to match the characteristic fluid instability frequency 154, resulting in a Strouhal number of about 1.0. The phase relationship between the pulse bursts 151 and the fluid instabilities can be varied and selected to produce the desired effect on the boundary layer. For example, in some embodiments, the pulse bursts 151 can be timed to be approximately 180° out of phase with the maximum amplitude of the fluid instabilities. In general, it is expected that selecting the Strouhal number to be approximately 1.0 will produce the greatest impact on the boundary layer, but in other embodiments, the modulation frequency 153 can be selected to have other relationships relative to the characteristic fluid instability frequency 154 and accordingly can have Strouhal numbers other than 1.0.

Figure 2B:
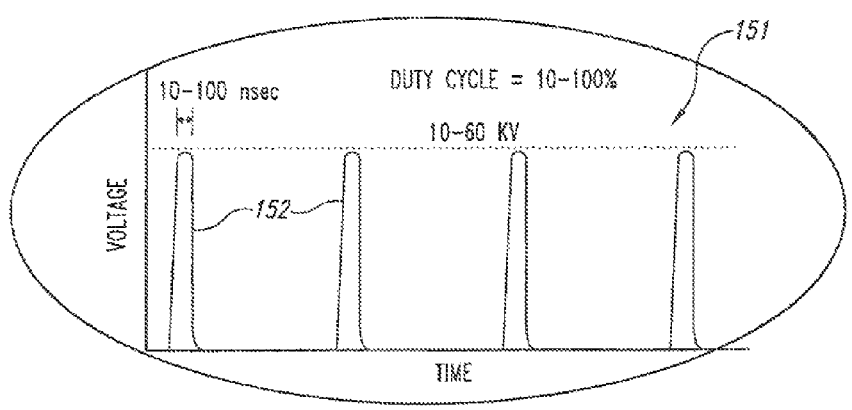

FIG. 2B is an enlarged illustration of one of the pulse bursts 151 shown in FIG. 2A. For purposes of illustration, the pulse bursts 151 shown in FIGS. 2A and 2B have four pulses 152, but in other embodiments, the pulse bursts 151 may have a greater or lesser number of pulses 152. Each of the pulses 152 can have a relatively high voltage and short duration, and can be monophasic (e.g., delivered at a single polarity). For example, as shown in FIG. 2B, each of the pulses 152 can have a pulse duration of from about 10 nanoseconds to about 100 nanoseconds, (e.g., 10-20 nanoseconds) and an amplitude of from about 10 kilovolts to about 60 kilovolts (e.g., 20, 30, 40 or 50 kilovolts). In one embodiment, the pulses 152 can be produced at a frequency of about 6 kHz, but in other embodiments, the frequency of the pulses 152 can be much higher. For example, in representative embodiments, the pulses 152 can have a frequency of from about 10 kHz to about 100 kHz. It is expected that the monophasic pulses will be more likely to have a beneficial effect on the adjacent boundary layer flow than conventional biphasic sinusoidal AC pulses.

The duty cycle in accordance with which the pulses 152 are produced (e.g., the percentage of time that the pulses are active or "on") can vary from about 10 percent to about 100 percent. A duty cycle of 100% indicates that the pulses 152 are continually active. In general, it is desirable to have a duty cycle of less than 100% to conserve power, to produce distinct pulses 152, and to produce pulse bursts 151 that are spaced apart in time in a manner that corresponds to the characteristic fluid instability frequency 154 shown in FIG. 2A. Accordingly, the duty cycle is generally a function of the pulse width, the frequency at which individual pulses 152 are generated, the number of pulses 152 in the pulse bursts 151, and the spacing between pulse bursts 151. These parameters can be selected to produce the desired effect on the boundary layer, while consuming as small an amount of power as is required to have the desired effect. The foregoing characteristics (e.g., the modulation frequency 153, the number of pulses 152 in a pulse burst 151, and the pulse width and frequency of the pulses 152) can be varied depending upon the conditions of the boundary layer. For example, the wave form 150 may have different characteristics when delivered into a low speed flow than when delivered into a high speed flow. Accordingly, the controller 137 (FIG. 1) can be programmed with instructions that automatically control the delivery parameters in a manner that depends on local flow characteristics, and/or other factors.

In general, it may be desirable to keep pulse widths as short as possible (while still maintaining flow control) to conserve power and/or to prevent arcing between adjacent electrodes. In some cases, it may be advantageous to deliver pulses having pulse widths up to 100 nanoseconds or above (so long as the electrodes do not arc unacceptably), so as to ease the manufacturability constraints on the discharge devices.

FIG. 3 is a chart illustrating representative implementations of devices such as the actuator 131 shown in FIG. 1. As shown in FIG. 3, the actuators can be applied to a number of aerodynamic surfaces and a number of types of air vehicles to produce enhanced results, based generally on increased control over the boundary layer on the aerodynamic surfaces.

FIG. 4A is an isometric illustration of a fixed wing aircraft, illustrating representative implementations of actuators in accordance with a variety of embodiments of the disclosure. Such actuators may be positioned at the aft body of the aircraft fuselage to reduce drag, and/or on the trailing edge devices to improve aerodynamic performance of these devices by controlling the boundary layer flowing over these devices. Such actuators may also be placed on the leading edge high lift devices to produce a similar effect. Actuators may be positioned on or near the landing gear to control airflow separation from the landing gear and reduce buffeting. Actuators may also be placed over the surface of the wing to control the boundary layer flow over the wing, and in at least some cases, effectively change the camber of the wing aerodynamically (e.g., without changing the solid contours of the wing), thus allowing the camber of the wing to be adjusted at different flight conditions by selectively activating the actuators and/or selectively changing the manner in which the actuators deliver energy into the adjacent flow. Actuators may also be positioned at the vertical stabilizer to provide additional control of the airflow adjacent to the vertical stabilizer and, in at least some cases, allow the vertical stabilizer to have a reduced size as a result.

Figure 4B:
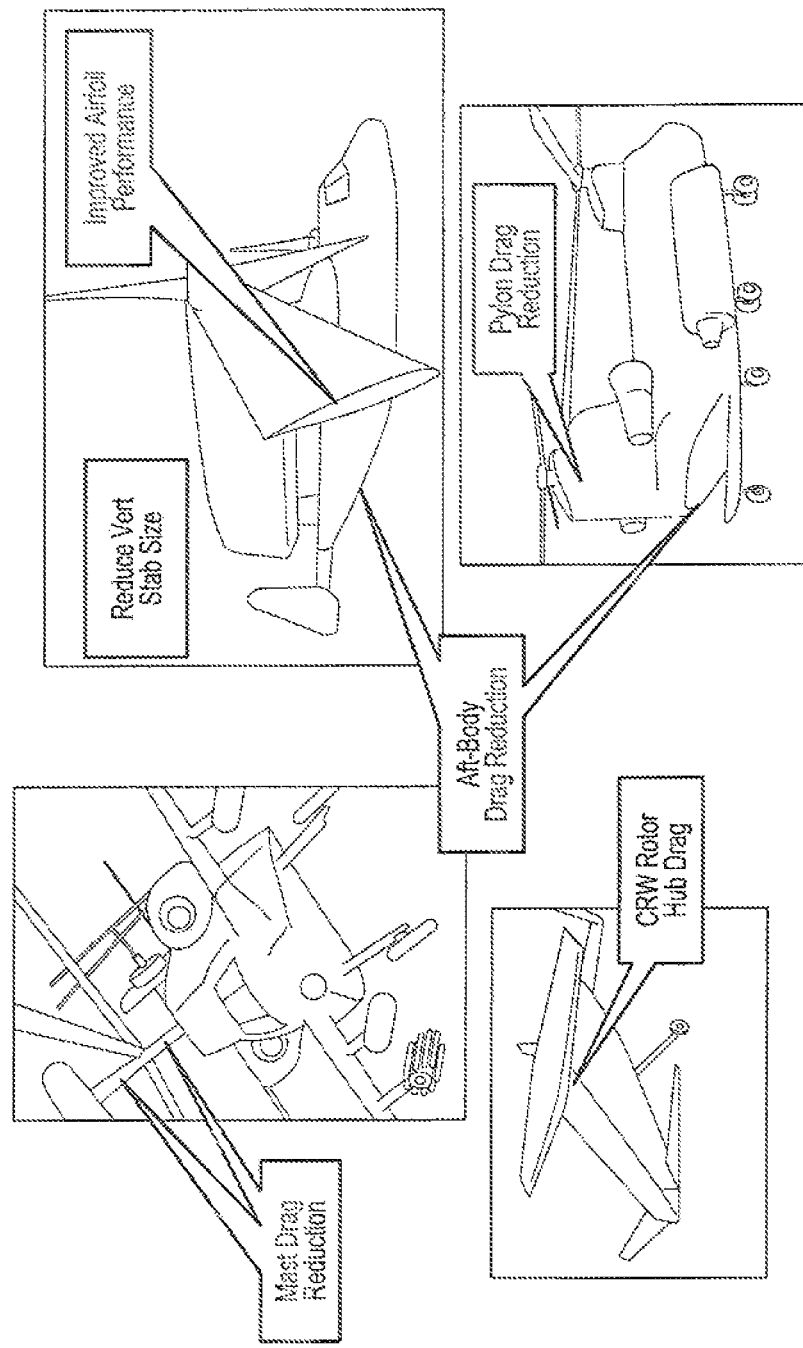
FIG. 4B illustrates several rotor craft with corresponding locations at which actuator devices may be positioned in particular embodiments.

FIG. 4B illustrates representative actuator installations for rotor craft. The actuators can be installed on the rotor mast to reduce drag, on the vertical stabilizer (for rotor craft that include a vertical stabilizer) to reduce stabilizer size, on rotor pylons to reduce drag on the pylons, on the rotor craft aft body to reduce aft body drag, and/or on the rotors themselves to improve rotor performance. In a particular embodiment, the actuators may be positioned on the rotors to reduce the likelihood for separation during the downwind portion of the rotor rotation cycle, e.g., to prevent or delay retreating blade stall. Such an installation is expected to have a significant beneficial effect on the performance of the rotors by enhancing lift and/or reducing drag, and/or reducing rotor vibration (e.g., by dynamically controlling unsteady pressure loads on the rotor).

FIGS. 5A and 5B further illustrate representative installations of actuators in accordance with particular embodiments of the disclosure on fixed wing aircraft. The actuators can have beneficial effects for a wide variety of installations on both military and commercial aircraft. FIG. 5C further illustrates representative actuator installation locations for rotor craft. FIG. 5D identifies representative actuator installation locations for inlets and associated flow surfaces (e.g., inlet forebodies).

Figure 6A:
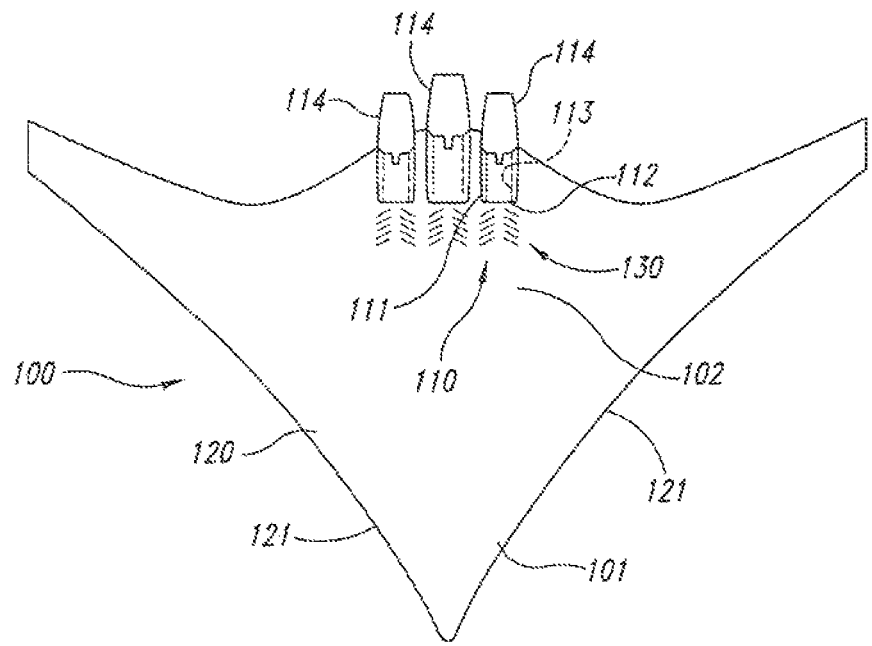
FIGS. 6A-6B are schematic illustrations of a blended wing body aircraft having actuators located at a forebody surface in accordance with a particular embodiment of the disclosure.

FIG. 6A illustrates a representative aerodynamic body 100 on which a flow control assembly 130 is installed in accordance with a particular embodiment. The aerodynamic body 100 can include an aircraft 101 having an airfoil 120 and one or more engines 114 (three are shown in FIG. 6A for purposes of illustration). The aircraft 101 shown in FIG. 6A has a blended wing-body configuration with the engines 114 located aft. In other embodiments, the aerodynamic body 100 can have other configurations capable of atmospheric flight (such as those shown in FIGS. 4A-5D), including, without limitation, tube and wing configurations (typical of commercial transports and private aircraft), missile configurations, or rotorcraft configurations. The aircraft 101 can be manned or unmanned. In a particular embodiment shown in FIG. 6A, the flow control assembly 130 is positioned to control the flow entering the engines 114. In other embodiments, the flow control assembly can be positioned to control the flow over other portions of the aircraft, including the airfoil 120, as will be discussed later.

Air is supplied to the engines 114 via an air induction system 110. The air induction system 110 can include one or more inlets 111 (e.g., one inlet 111 per engine 114), each having an inlet aperture 112 and an inlet duct 113 that directs air in an aft direction to the engine 114. In the configuration shown in FIG. 6A, the inlets 111 are located at a point well aft of a forward leading edge 121 of the airfoil 120. Accordingly, a surface 102 of the aerodynamic body 100 is positioned upstream of the apertures 112 such that intake air moves over the surface 102 prior to being received by the inlets 111. A boundary layer of low velocity air builds up on the surface 102 beginning at the leading edge 121, and moves in a generally aft direction toward the inlets 111. The illustrated flow control assembly 130 is positioned to control the boundary layer air before it enters the inlets 111. Optionally, the flow control assembly 130 can be positioned to control the flow within the inlets 111, in addition to or in lieu of controlling the flow external to the inlets 111.

Figure 6B:
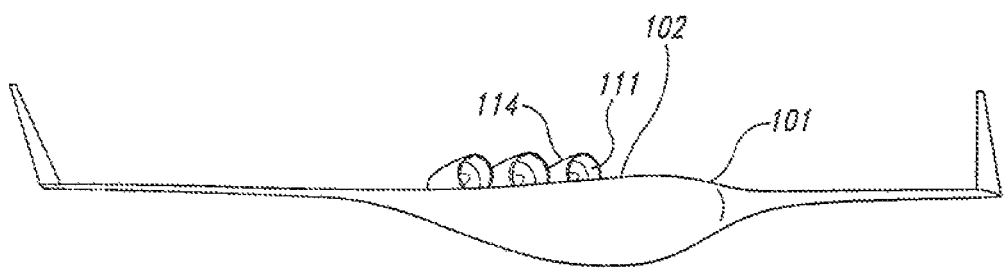

As shown in FIG. 6B, the inlets 111 can have a generally round shape that may or may not be offset upwardly away from the flow surface 102. When the inlets 111 are offset away from the flow surface 102, a diverter can be positioned between the inlets 111 and the flow surface 102 to remove some or all of the boundary layer flow. However, in many cases, it is desirable not to offset the inlets 111 from the flow surface 102 so as to reduce weight and drag. The flow control assembly 130 (FIG. 6A) can replace the diverter (or at least reduce the size of the diverter) in the foregoing instances, as described below with reference to FIG. 7.

Figure 7:
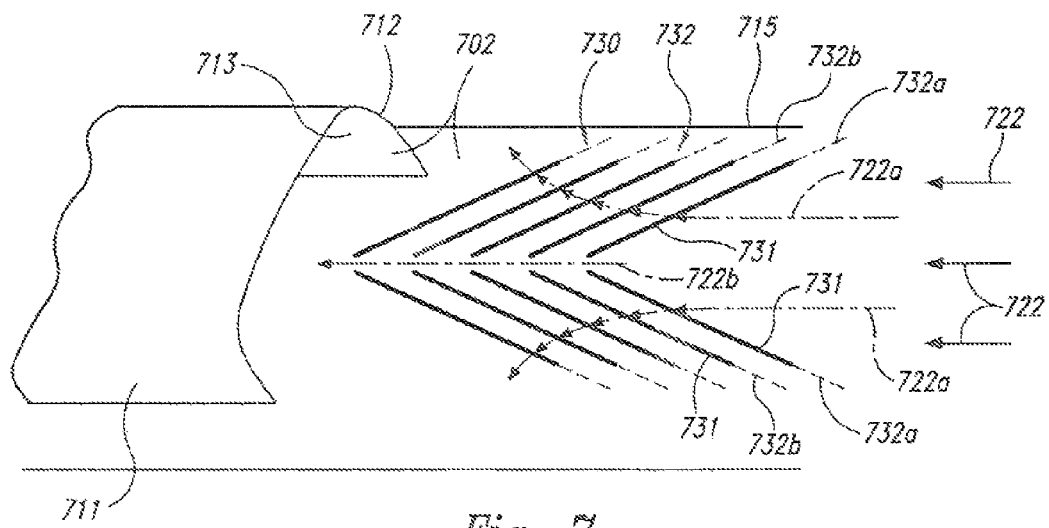
FIG. 7 is a schematic illustration of an aircraft inlet having a flow control system configured in accordance with an embodiment of the disclosure.

FIG. 7 is a top perspective illustration of a portion of an integrated, non-axisymmetric, diverter-less inlet 711. In one aspect of this embodiment, the inlet 711 includes an inlet aperture 712 and an inlet duct 713 positioned aft of the inlet aperture 712. The inlet aperture 712 has a non-axisymmetric shape and is positioned aft of a forebody surface 715. Accordingly, a flow surface 702 directing air into the inlet aperture 712 and then aft to the engine (not visible in FIG. 7) can include portions of the forebody 715 and/or portions of the inlet duct 713.

A flow control assembly 730 is positioned at the flow surface 702 to control the flow entering the inlet 711. In a particular aspect of an embodiment shown in FIG. 7, the flow control assembly 730 is installed at the forebody 715. In other embodiments, portions of the flow control assembly 730 may be installed in the inlet duct 713, in addition to or in lieu of the location at the forebody 715. The flow control assembly 730 in the illustrated embodiment includes multiple actuators 731 (e.g., dielectric barrier discharge devices, plasma actuators, other electrically operated ionizing devices, and/or other energy-emitting devices) arranged forward of the inlet 711. Individual actuators 731 may be arranged in rows 732 (two of which are specifically identified as rows 732a and 732b) that are oriented at least partially transverse to incoming flow streamlines 722 and to the inlet aperture 712. In still a further particular aspect of the arrangement shown in FIG. 7, the rows 732 can be angled relative to the incoming streamlines 722 so as to form a "chevron" pattern. Accordingly, at least some of the incoming boundary layer flow can be directed outboard, away from the inlet 711 (as indicated by flow streamlines 722a) and/or some of the flow directed into the inlet 711 can be energized (as indicated by streamline 722b). The number of rows 732 of actuators 731 can be selected to be as small as possible while still providing the desired boundary layer diversion and/or energizing effect. For example, the forebody 715 can include five rows 732 of actuators 731 positioned forward of the inlet 711. In other embodiments, the number of rows 732 can be different, depending upon the specific geometry into which the actuators 731 are integrated.

Figure 8:
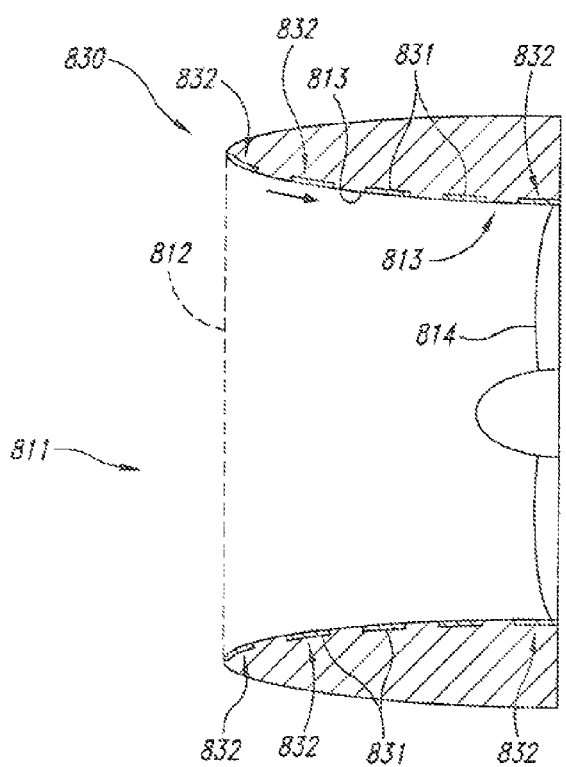
FIG. 8 is a partially schematic cross-sectional illustration of an inlet having a flow control assembly configured in accordance with another embodiment of the disclosure.
Figure 9:
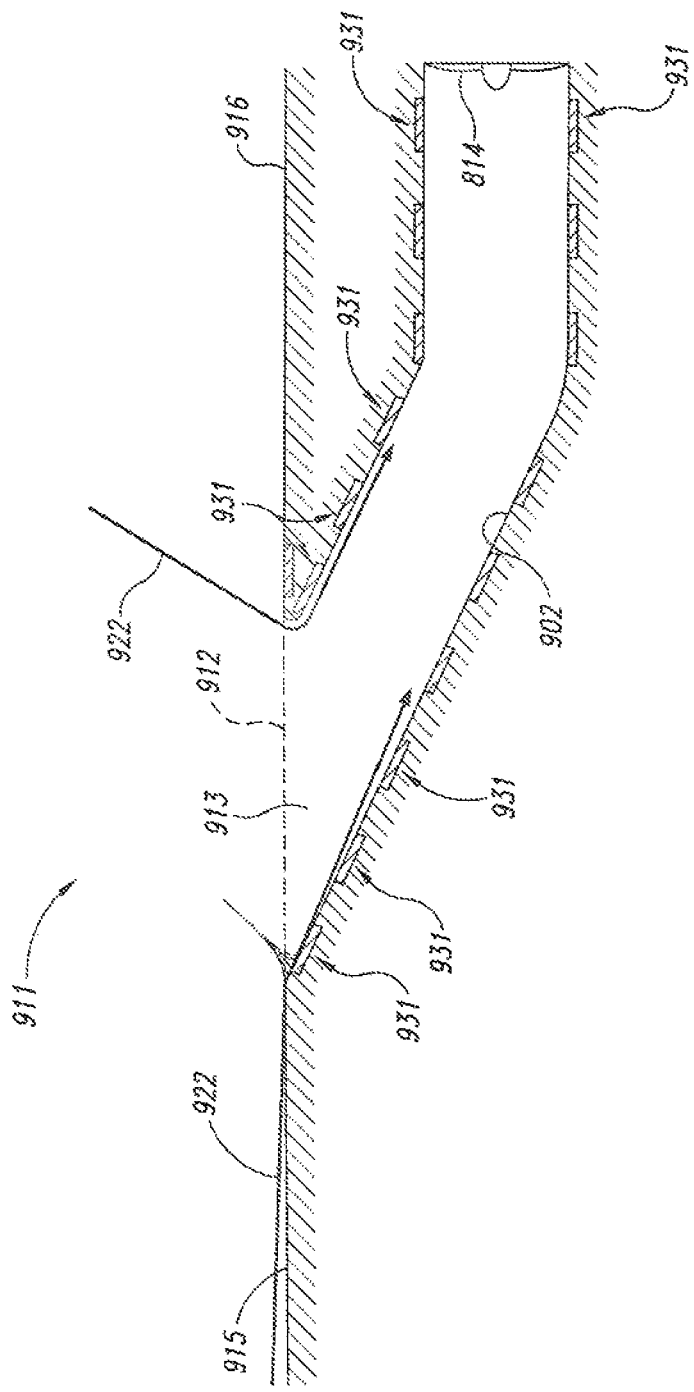
FIG. 9 is a partially schematic, cross sectional side view of an inlet having a flow control assembly configured in accordance with still another embodiment of the disclosure.

FIGS. 8 and 9 illustrate inlets having flow control assemblies configured in accordance with other embodiments of the invention. For example, FIG. 8 illustrates a generally axisymmetric inlet 811 (such as is typically used on a commercial jet aircraft) having a generally circular inlet aperture 812 and a generally axisymmetric inlet duct 813 positioned forward of an engine 814. An associated flow control assembly 830 includes actuators 831 positioned in multiple circumferential rows 832 between the inlet aperture 812 and the engine 814. For purposes of illustration, only the top-most and bottom-most actuators 831 are shown for each row 832. Each actuator 831 can have a configuration generally similar to that described above with reference to FIG. 1, and can have applied to it a waveform generally similar to that described above with reference to FIGS. 2A-2B. The actuators 831 can be arranged in a series of five rows, as shown in FIG. 8, or fewer rows. In any of these embodiments, the effect of the actuators 831 is to control the flow entering the inlet 811 so as to reduce the likelihood for flow separation, increase the total pressure recovery, and/or reduce flow distortion at the engine entrance.

FIG. 9 illustrates another representative inlet 911 having a forebody 915 positioned forward of an inlet aperture 912, and an adjacent or aft surface 916 positioned aft of the aperture 912. Actuators 931 may be positioned along the corresponding flow surface 902 within the inlet duct 913 to energize the boundary layer flow, and in particular, to prevent flow separation as the flow turns into the inlet duct 913 from the forebody 915 and from regions aft of the inlet aperture 912 (indicated by streamlines 922). The orientation of the actuators 931 at the flow surface 902 can be spanwise and/or streamwise. In the streamwise orientation, the energy delivered by the actuators 931 can create a vortex that rolls up along the streamwise direction. The vortex can accordingly mix higher momentum air outside the boundary layer into the lower momentum boundary layer flow, delaying boundary layer separation. Optionally, the actuators 931 may also be installed at the forebody 915.

FIGS. 10A-10C illustrate representative flow control assemblies installed on an airfoil to energize and/or control the adjacent boundary layer. Beginning with FIG. 10A, a flow control assembly 1030 is installed on an airfoil 1020 having a flow surface 1002 with a leading edge 1021. The flow control assembly 1030 can include actuators 1031 arranged in a single row at or near the leading edge 1021. In another arrangement, the actuators 1031 can be arranged in a single row aft of the leading edge 1021, as is also shown in FIG. 10A. It is expected that in at least some embodiments, the single row of actuators 1031 (whether located at or near the leading edge 1021, or well aft of the leading edge 1021) will be sufficient to energize the boundary layer passing over the flow surface 1002 in a manner that reduces skin friction and/or reduces the tendency for the flow to separate from the flow surface 1002.

FIG. 10B is a partially schematic, cross-sectional illustration of the airfoil 1020, illustrating one actuator 1031 from the row of actuators 1031 positioned at the leading edge 1021. In this arrangement, the actuator 1031 is the only actuator 1031 carried by the airfoil 1020 at a streamwise line 1022 that intersects the actuator 1031. By positioning the actuator 1031 at or near the leading edge 1021 (e.g., at or near the stagnation point), it is expected that the flow control assembly 1030 will improve the performance of the airfoil 1020 at angles of attack. In particular, it is expected that the flow control assembly 1030 will reduce the likelihood for flow separation near the leading edge 1021 at high angles of attack.

In other embodiments, additional rows of actuators may be added to the airfoil, depending upon airfoil geometry and/or expected flight conditions. For example, as shown in FIG. 10C, the actuators 1031 can be arranged in two or three rows proximate to the leading edge 1021. The multiple actuators, spaced apart from each other in a streamwise direction, can create multiple mixing vortices that re-energize the boundary layer. An advantage of this arrangement is that vortical mixing is introduced in the streamwise direction and can persist to provide re-attachment and/or delay separation, not only in the immediate region around the actuators 1031, but also downstream (e.g., well downstream) of this region.

Figure 11A:
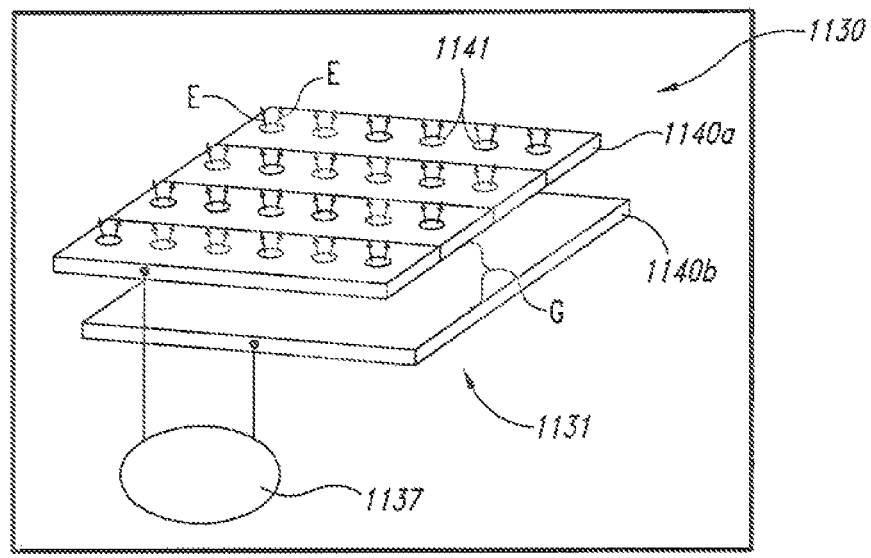
FIGS. 11A-11B are partially schematic illustrations of actuators arranged in a grid array in accordance with another embodiment of the disclosure.
Figure 11B:
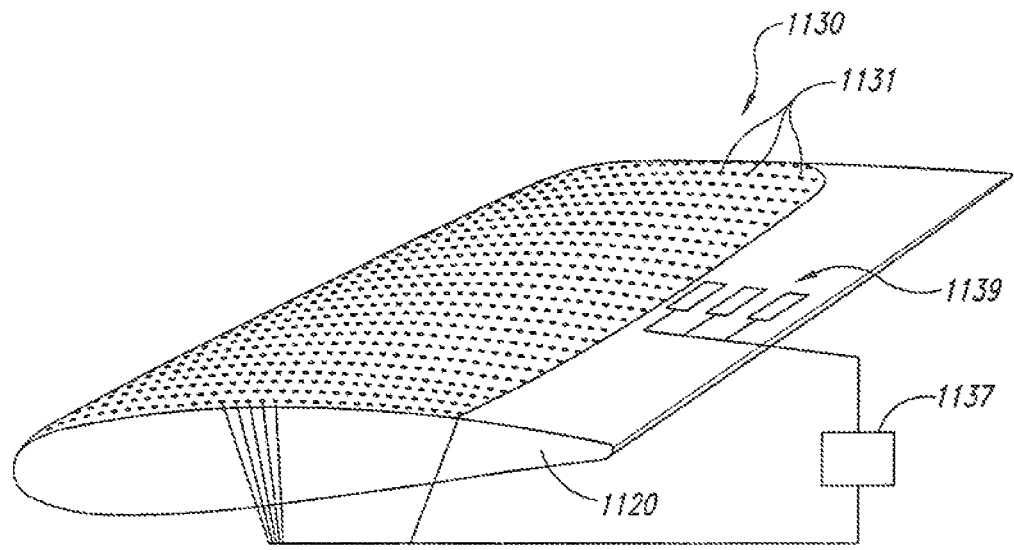
Figure 12:
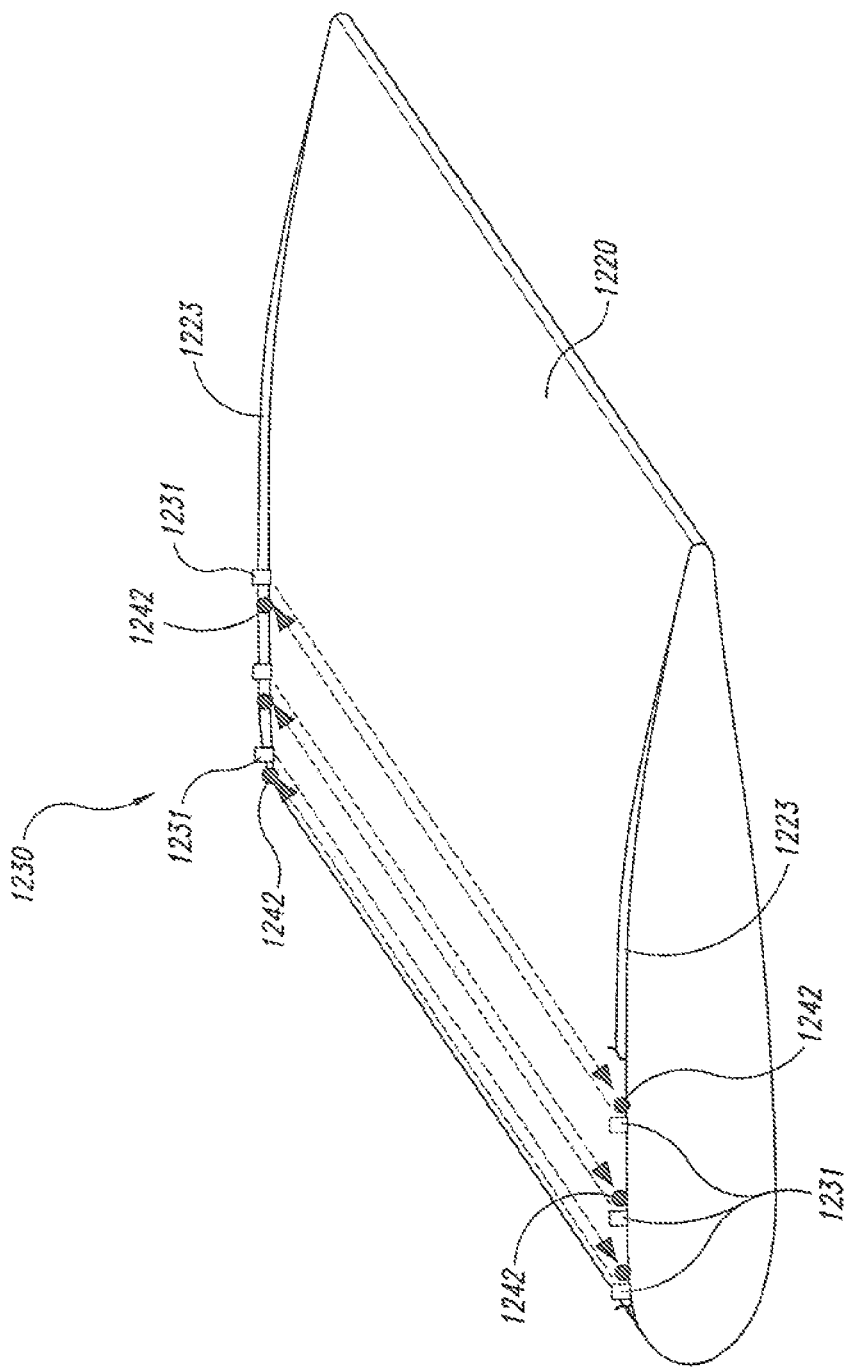
FIG. 12 is a partially schematic illustration of an airfoil having laser beam actuators arranged in accordance with a particular embodiment of the disclosure.

In any of the installations described above with reference to FIGS. 3-10, the actuator can have a dielectric barrier discharge configuration, generally as shown in FIG. 1, or the actuator can have other configurations that also add energy to the flow in a directed manner to produce a more favorable velocity distribution. The more favorable velocity distribution can produce enhanced performance, e.g., an increased region of laminar flow, a delay in boundary layer separation, an increase in flow uniformity, and/or an expanded flight envelope before separation is encountered. FIG. 11A-12 illustrate embodiments of devices that add energy to the flow in accordance with mechanisms other than a dielectric barrier discharge mechanism, with the expected results being at least similar to those described above.

FIG. 11A illustrates a flow control assembly 1130 configured in accordance with one such embodiment. The flow control assembly 1130 can include an actuator 1131 that in turn includes at least two spaced-apart plates 1140 (shown as a first plate 1140a and a second plate 1140b). The two plates 1140a, 1140b are separated by a gap G and are coupled to a controller 1137. In a particular embodiment, the controller 1137 applies a high voltage to the first plate 1140a, with the second plate 1140b operating as a ground plane. The first plate 1140a can also include holes 1141 that allow particles (e.g., electrons) to exit the actuator 1131 into the adjacent flow. Accordingly, the actuator 1131 can operate in the manner of a hollow cathode array or particle accelerator. In particular, the voltage difference between the first plate 1140a and the second plate 1140b can accelerate electrons toward the first plate 1140a. The electrons then exit through the first plate 1140a via the holes 1141 (as indicated by arrows E) and collide with air molecules in the adjacent flow. It is expected that in at least some modes of operation, the transfer of kinetic energy from the electrons to the air molecules can energize the adjacent boundary layer and can accordingly reduce the likelihood for the boundary layer to separate.

In particular embodiments, it is desirable to obtain a high electric field between the two plates 1140a, 1140b so as to accelerate the electrons to a sufficient velocity to energize the adjacent boundary layer flow. For example, the first plate 1140a can have applied to it a voltage in the range of hundreds to thousands of volts, and the field strength can be increased by minimizing the gap G between the first and second plates 1140a, 1140b. In a particular embodiment, the gap G can have a value in the range of from about 0.040 inches or less, the holes can have a diameter of about 0.040 inches or less, and the holes can be spaced apart to create a wide range of energy densities which are expected to be sufficient to generate a high energy electron stream, without causing the two plates to arc. For example, the holes can have a diameter of 75 micron or less. Suitable cathode discharge devices are described in U.S. Pat. Nos. 6,518,692, 6,528,947, and an article entitled "Development and Characterization of Micromachined Hollow Cathode Plasma Display Devices," (Chen et al., Journal of Microelectromechanical Systems, October 2002) incorporated herein by reference.

In particular embodiments, the flow control assembly 1130 can include multiple actuators 1131. For example, as shown in FIG. 11B, the flow control assembly 1130 can include an array of actuators 1131, each having characteristics generally similar to those described above with reference to the actuator 1131 shown in FIG. 11A. The actuators 1131 can be distributed over the surface of an airfoil 1120, or any of the other surfaces and/or installations described above with reference to FIGS. 3-10C. The actuators 1131 can be positioned over an entire forward region of the airfoil 1120, or the actuators 1131 can be positioned only at selected locations over the surface of the airfoil 1120. In any of these embodiments, the controller 1137 can individually control each of the actuators 1131, and/or groups of the actuators 1131. For example, the controller 1137 can control the waveform parameters applied to each individual actuator 1131 and/or groups of actuators 1131, e.g., the frequency, pulse width, amplitude, duty cycle, and/or phase relationship of the signals emitted by each of the actuators 1131. In particular embodiments, the individual control over each of the actuators 1131 can allow the actuators 1131 to be operated in a synergistic manner. For example, the actuators 1131 can be controlled to create waves that constructively and/or destructively interfere with each other in a manner that can better manipulate the adjacent boundary layer flow. In a particular embodiment, the actuators 1131 can be spaced apart and activated in accordance with a schedule that produces constructively interfering (e.g., coalescing) shock waves. Suitable positions for the actuators 1131 and associated timing schemes can be determined experimentally using flow visualization techniques such as Schlieren techniques. In addition to or in lieu of such techniques, predictive tools (e.g., computational fluid dynamic or CFD tools) can be used to determine appropriate locations and timing patterns for activating the actuators 1131. In any of these embodiments, synchronizing the activation schedules of the multiple actuators 1131 is expected to increase the strength of the resulting shock waves, which in turn is expected to increase boundary layer mixing and therefore reduce the likelihood for boundary layer separation. In particular embodiments, individual actuators 1131 can produce hemispherical shock patterns, and lines of actuators 1131 can produce hemicylindrical shock patterns. These patterns can be selectively timed to constructively interfere with each other to establish enhanced boundary layer mixing in any of a variety of directions (e.g., a streamwise direction or a cross-stream direction). This arrangement can be particularly important because turbulence in such boundary layers is generally a three-dimensional effect (particularly when the airfoil 1120 is swept or forms a portion of a rotating rotor). By controlling individually addressable actuators 1131, the controller 1137 can activate particular actuators 1131 at particular times, with particular energies and/or phase delays to produce a three-dimensional effect that is expected to more effectively control the adjacent boundary layer. The activation schedule for individual actuators 1131 and/or groups of actuators 1131 can be changed to account for changes in local flow conditions (e.g., freestream Mach number, angle of attack and/or others).

In particular embodiments, the airfoil 1120 can include a detector 1139 (shown schematically in FIG. 11B) that in turn includes one or more detector elements positioned to identify flow characteristics. The detector 1139 can include one or more pressure taps, one or more hot film anemometers, and/or other devices that are located downstream from the actuators 1131 (as shown in FIG. 11B), within the array of actuators 1131, and/or upstream of the actuators 1131. The detector 1139 can be used to identify target flow conditions, e.g. incipient flow separation, or actual flow separation, turbulent flow, or laminar flow. These flow characteristics can change over different flight conditions, which can dictate a change in the number and/or location of actuators that are activated, and/or the wave form or other parameters in accordance with which energy is emitted by the actuators. Accordingly, based on information received from the detector 1139, the controller 1137 can identify target actuators 1131 to activate, and can be programmed to deliver signals to the target actuators 1131 that are expected to enhance the characteristics or the adjacent boundary layers flow in a closed-loop feedback manner.

The arrangement of actuators (e.g., hollow cathode arrays) shown in FIG. 11B can be applied to actuators other than the particle accelerator actuators shown in FIG. 11A. For example, such an arrangement can be used in conjunction with the dielectric barrier discharge actuators described above with reference to FIG. 1.

FIG. 12 illustrates an airfoil 1220 having a flow control assembly 1230 in accordance with still another embodiment of the disclosure. In this particular embodiment, the airfoil 1220 include opposing fences 1223 projecting generally normally outwardly from the aerodynamic surface. For purposes of illustration, the near-side fence 1223 (shown toward the bottom of FIG. 12) is shown partially cut away. The fences 1223 can house opposing radiation emitters 1231 (e.g., laser emitters) that direct radiation across the surface of the airfoil 1220 to corresponding receivers 1242 (e.g., reflectors). Each of the emitters 1231 can emit radiation selected to correspond (or approximately correspond) to the absorption spectrum for air (e.g., laser radiation of wavelengths greater than about 200 nm). Each of the radiation beams emitted by the corresponding emitters 1231 can be oriented so as to have the desired direction across the surface of the airfoil 1220. Adjacent emitters 1231 can be fired in succession to produce a desired effect (e.g., a traveling wave) on the adjacent boundary layer flow. The emitters 1231 can be positioned on opposite sides of the airfoil 1220 to increase the uniformity with which energy is directed into the adjacent airflow across the span of the airfoil 1220. Each of the receivers 1242 can receive unabsorbed radiation from a corresponding oppositely-positioned emitter 1231 and reflect the received energy, dissipate the received energy, or recycle the energy so that it can be redirected into the adjacent boundary layer flow. Accordingly, the foregoing arrangement of emitters and reflectors can direct energy along multiple passes through the intervening space to increase absorptive heating. Suitable laser generators are described in an article titled "Process Study of a 200 nm Laser Pattern Generator," (Hye-Keun Oh, Journal of. the Korean Physical Society, December 2002), incorporated herein by reference, and are available from CryLaS GmbH of Berlin, Germany.

In another embodiment, a flow control assembly can include a surface mounted array of UV light sources. The array of UV light sources can, in one embodiment, be arranged similarly to the flow control assembly 1130 of FIGS. 11A and 11B.

In other embodiments, the flow control assembly 1230 can have other arrangements. For example, rather than an array of fixed laser emitters and receivers, one or more of the laser emitters can rotate or otherwise be movable so as to sweep the emitted laser beam over the surface of the airfoil 1220. In any of these embodiments, it is expected that the energy provided by the laser to the adjacent boundary layer flow will act to delay the transition of the flow from laminar flow to turbulent flow, and/or delay the location at which the boundary layer separates. For example, the energy emitted by the laser emitters 1231 can be pulsed in a manner generally similar to or analogous to that described above with reference to FIGS. 2A-2B.

From the foregoing, it will be appreciated that specific embodiments have been described herein for purposes of illustration, but that the disclosure encompasses additional embodiments as well. For example, the actuators described above may have configurations other than those specifically shown in the Figures. The signal parameters in accordance with which the actuators are activated may also have values other than those specifically shown and described above, and such values may be selected in a manner that depends upon the particular installation and/or the flight conditions to which the aerodynamic surface is exposed. The actuators may be installed on geometries, having features other than those specifically shown in the Figures. For example, the actuators may be applied to short, highly offset inlet diffusers. Certain aspects of the disclosure described in the context of particular embodiments may be combined or eliminated in other embodiments. For example, the actuators shown in FIG. 1 may be combined to form an array generally similar to that shown in FIG. 11B. Further, while advantages associated with certain embodiments have been described in the context of those embodiments, other embodiments may also exhibit such advantages, and not all embodiments need necessarily exhibit such advantages to fall within the scope of this disclosure. The following examples provide additional representative embodiments.

We claim:

1. An apparatus for controlling air vehicle airflow, comprising:
 an airflow surface;
 a two-dimensional array of individually addressable actuators positioned at the airflow surface, with individual actuators coupled to a power source to deliver energy into boundary layer flow adjacent to the airflow surface; and
 a controller operatively coupled to the individual actuators, the controller being programmed with instructions for sequentially pulsing the actuators in a generally streamwise direction to cause shock waves from individual actuators to coalesce.

2. The apparatus of claim 1 wherein the individual actuators are dielectric barrier discharge actuators.

3. The apparatus of claim 1 wherein the individual actuators include ultraviolet energy emitters.

4. The apparatus of claim 1 wherein the individual actuators include particle accelerators.

5. The apparatus of claim 1 wherein the controller is programmed with instructions to activate different actuators at different times.

6. The apparatus of claim 1 wherein an individual actuator includes:
   a radiation emitter positioned to direct radiation generally parallel to the airflow surface; and
   a receiver spaced apart from the emitter to receive radiation after the radiation has transited over at least a portion of the airflow surface.

7. The apparatus of claim 6 wherein the radiation emitter includes a laser emitter.

8. The apparatus of claim 6 wherein the radiation emitter includes an emitter of radiation at wavelengths greater than about 200 nm.

9. The apparatus of claim 6 wherein the radiation emitter is positioned to direct radiation transverse to a direction of airflow over the airflow surface.

10. The apparatus of claim 6 wherein the receiver includes a reflective surface positioned to reflect received radiation back over the airflow surface.

11. The apparatus of claim 1 wherein an individual actuator includes:
    a hollow cathode actuator positioned to inject high energy electrons at an angle to the airflow surface.

12. The apparatus of claim 11 wherein individual hollow cathode actuators are positioned to inject high energy electrons generally normal to the airflow surface.

13. An apparatus for controlling air vehicle airflow, comprising:
    an airflow surface;
    a two-dimensional array of individually addressable actuators positioned at the airflow surface, with individual actuators coupled to a power source to deliver energy into boundary layer flow adjacent to the airflow surface; and
    a controller operatively coupled to the individual actuators, the controller being programmed with instructions that, when executed:
        sequentially pulse the actuators in a generally streamwise direction to cause shock waves form individual actuators to coalesce.

* * * * *